Jan. 2, 1934.   L. M. GILL   1,941,982
FILTERING DEVICE
Filed Dec. 2, 1930
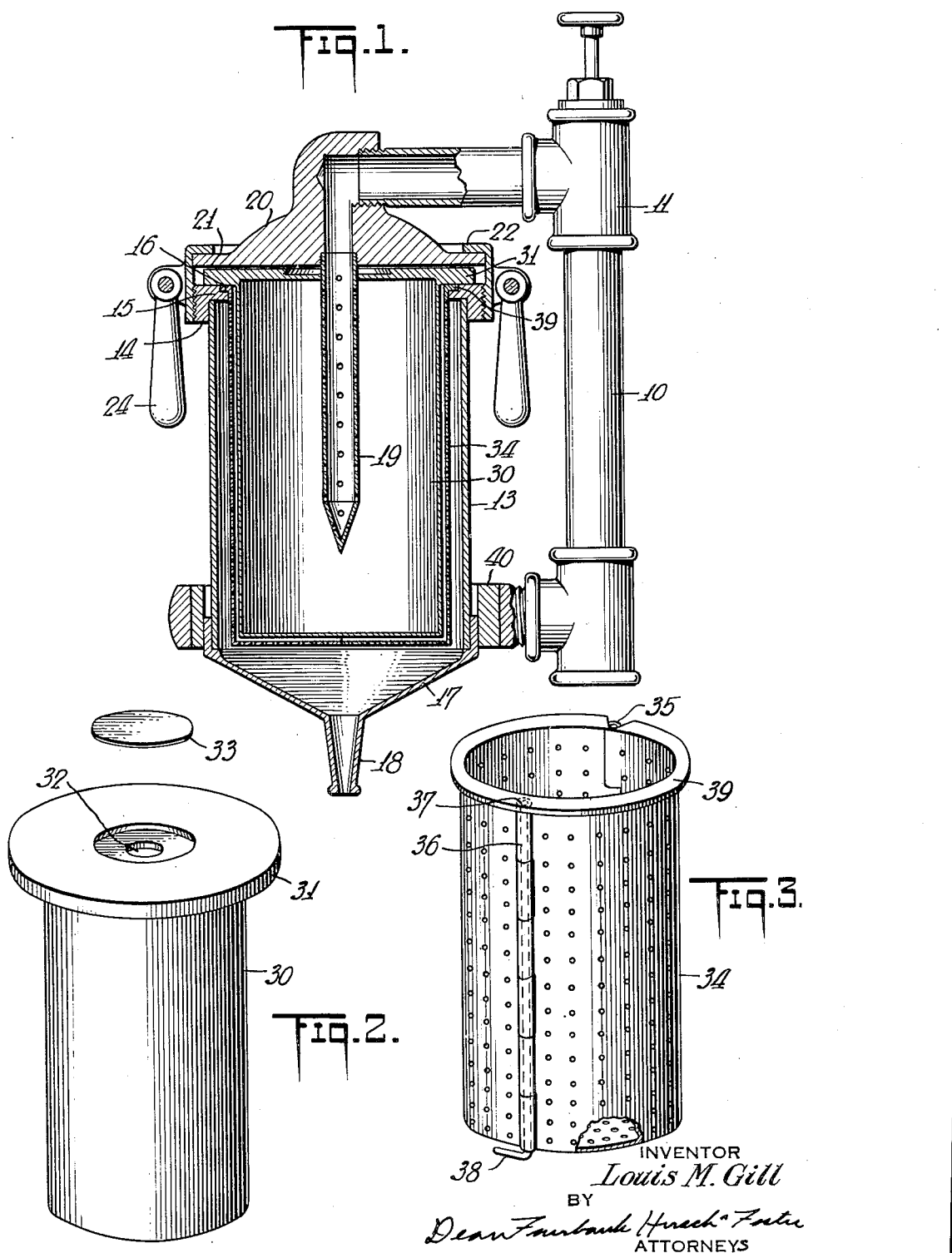
INVENTOR
Louis M. Gill
BY
ATTORNEYS Patented Jan. 2, 1934

1,941,982

UNITED STATES PATENT OFFICE 1,941,982

FILTERING DEVICE

Louis M. Gill, Brooklyn, N. Y., assignor to Darco Sales Corporation, New York, N. Y., a corporation of Delaware Application December 2, 1930. Serial No. 499,436

10 Claims. (Cl. 210—86)

The invention relates to a new and improved filter adapted to the filtration of liquids in general, but having special advantages when embodied in a form particularly adapted to the filtration of water for use in households, hotels, restaurants and other places where it is desired to filter the water for the purpose of rendering it potable or more palatable.

All water filters heretofore devised and with which I am familiar have been subjected to certain disadvantages among which are much difficulty, trouble and labor in the renewal or cleaning of the filter medium therein after it has entrained enough impurities to render it ineffective. Attempts have been made to circumvent these obstacles by providing means for reversing the flow of water so as to flush out a part of the impurities. Such washing is by no means thorough so that the entrained impurities, in spite of these washings, accumulate, making it necessary therefore to wash the filter media at progressively shorter intervals until the device must ultimately be completely dismantled and the filter media therein renewed.

Furthermore, the reversal of flow of the liquid disrupts the filter bed sufficiently to permit the passage of previously retained bacteria into the filter on the resumption of operation. The filter under these circumstances is not operated under the most sanitary conditions.

Also where activated or decolorizing carbon or bone char has been used in filters, there has always been more or less uncleanliness attending the renewal thereof, since these materials give off a black dust which when handled in the open readily soils the hands at the slightest contact.

The main object of the present invention is to provide means whereby the filtration medium of the filter may be expeditiously and tidily renewed or replaced with the incurrence of small expense and with no dusting, spilling or pouring and no soiling of the hands.

The invention also provides a new article of manufacture which includes a cartridge, constructed of paper or wood pulp, serving as a filter and enclosing a granular, pulverulent or other form of filtering or absorbent media, said cartridge having an easily removable closure member and shaped so as to be adaptable for use as part of the filter device, after said closure member has been punctured or removed. As the container is constructed of a cheap, inexpensive material, its replacement is not attended with the incurrence of unnecessary expense. It may be previously filled or partially filled with any clarifying, filtering, decolorizing, deodorizing, taste removing or absorbent material and sealed by the manufacturer. A supply of these cartridges may then be transported to points where the filters are installed and made available for immediate use when it is desired to replace the used filtering medium. For some uses the empty or partly filled cartridge shell may be employed and constitute the sole filtering medium.

The filled cartridges are so constructed that they may be put into service, and after service may be removed without exposing the contents of the cartridge, thereby permitting replacement of a contaminated or exhausted charge by a fresh one under hygienic as well as clean conditions. The replacement of a cartridge includes complete replacement of all surface or surfaces on which impurities from the water are deposited including both the cartridge shell and the filling material. It should also be noted that the use of such renewal cartridges greatly simplifies the rehabilitation of the filter, said cartridges being capable of renewal within a few minutes.

The present invention also contemplates a means whereby this cartridge is sustained against the disruptive force of the water. For this purpose, there is provided a rigid foraminous reinforcing or supporting casing having an inside shape corresponding to the outside shape of the cartridge. This casing may in some embodiments be a permanent part of the cartridge or sold with it and of such design and expense that it may be thrown away with the used cartridge, or it may have means whereby said casing may be expeditiously opened for removal of old cartridges and closed to embrace and support the outside of the inserted one.

The casing is advantageously constructed of foraminous metal or porous parts hinged together in such a way that the insertion and removal of the cartridge is facilitated. In this way, the casing can be opened, the cartridge disposed therein, and said casing closed into embracing relationship therewith. When it is desired to renew the cartridge, the casing is opened so as to expose the cartridge and said cartridge removed.

The invention also consists in certain new and important features of construction and combinations of parts hereinafter set forth and claimed.

Although the novel features which are believed to be characteristic of this invention will be particularly pointed out in the appended claims, the invention itself, as to its objects and advantages, the mode of its operation and the manner of its organization may be better understood by referring to the following description taken in connection with the accompanying drawing forming a part thereof, in which Fig. 1 is a vertical section through a filter unit embodying my invention.

Fig. 2 is a perspective view of one of the cartridges, the closure being shown in removed position, and Fig. 3 is a perspective showing the foraminous casing for supporting the cartridge of Fig. 2.

Like reference characters denote like parts in the several figures of the drawing.

In the following description and in the claims parts will be identified by specific names for convenience, but they are intended to be as generic in their application to similar parts as the art will permit.

In the specific form of the invention shown, there is provided any suitable form of water supply duct 10 having a control valve 11 and adapted to support or be attached to a filter unit. This includes a casing so formed as to permit ready insertion or removal of the filtering material. As shown it includes an outer cylindrical shell 13 advantageously constructed of rust-proof metal and provided at the top thereof with an annular collar 14 integral or rigid therewith, and having an inwardly extending flange 15 presenting an annular seat 16.

The bottom 17 of the shell 13 may be conical and terminate in a spout 18. The top 20 of the casing may be secured to the pipe 10 and is detachably secured to the wall 13. As one means of securing together the top 20 and the wall 13 and at the same time clamping the filter cartridge in place, the wall 13 or the collar 14 thereon, is externally threaded and a collar 22 is threaded thereto and provided with an inturned flange engaging the upper surface of the peripheral portion of the top 20. To facilitate the rotation of the collar 22 and the removal of the shell 13, the collar 22 is advantageously provided with a pair of turning handles 24 pivotally mounted on the periphery thereof. These normally depend, but may be swung out to give greater leverage.

Depending from the top 20 and connected to the pipe 10 is a perforated pipe 19 preferably pointed at the lower end and disposed coaxial with the cylinder but of shorter length.

The valve 11 is shown in the supply conduit to the casing and this is important as it permits shutting off the supply of liquid when it is desired to replace the cartridge, but such valve may be left open in operation and the flow otherwise controlled.

The filter includes a cylindrical cartridge 30 constructed of wood pulp, paper pulp or other similar porous filtering material analogous to filter paper. The process of making the cartridge forms no part of my invention. It may be made by the process described in U. S. Patent 1,305,203 or 1,527,157, or in any other suitable manner. The cartridge is filled with a pulverulent filter media, or other suitable media for clarifying or otherwise treating the liquid. This is preferably an activated decolorizing carbon such as that sold as "Hydro Darco", but may be charcoal, bone black, or other suitable pulverulent or granular material.

The cartridge has a flange member 31 which may be clamped between the collar 14 and the top wall 20 and has a top provided with a filling opening 32. Various types of closures may be provided. For instance, the top of the cartridge may have an annular depression encircling the filling opening for the reception of a closure member 33 which may be similar to the ordinary milk bottle closure and fit friction tight in the depression. This closure member may be provided with a tab or other suitable gripping means to facilitate its removal from the cartridge. Instead the closure member may be a piece of paper pasted across the opening after the filling. The cartridge can be filled at the factory or other point and shipped as a complete article of manufacture available for use by merely removing or puncturing the closure member. The cartridge when dry has strength and rigidity, but when wet the wall becomes soft and has very little strength.

For supporting the cartridge 30 against the disruptive force resulting from the pressure of the water and the expansion of the filter medium, there is provided a foraminous cylinder 34 of such shape and construction that it may be removed from the casing and opened or closed. As shown it has a hinge 35 along one generatrix thereof and is split at a diametrically opposite generatrix to permit the cylinder to open. The top is open and the bottom is formed of two semi-circular parts. The wall and bottom are advantageously made of metal although it may be constructed of rigid porous composition if desired. The inside diameter of the cylinder 34 is substantially the same as the outside diameter of the body of the cartridge 30 so that when closed it holds said cartridge in close circumferential relationship as well as supporting the bottom.

For clamping the cylinder 34 in closed position, said cylinder may be provided with a plurality of intermated bosses 36 with aligned apertures therethrough for the reception of a pintle 37. This may have an offset 38 to serve as a handle to permit its ready removal. When the cylinder 34 is disposed in the filter device, the offset 38 is turned inwardly as shown in Fig. 3 to prevent its interference with the outside shell 13. The upper edge of the cylinder has an outwardly extending flange 39 for engaging the seat 16 and supporting the cylinder and cartridge above the bottom 17 of the shell.

When it is desired to place a cartridge within the cylinder 34, the pintle 37 is removed and the two halves of said cylinder opened. The cartridge is then inserted in place so that its flange 31 rests on the flange 39. The two halves of the cylinder 34 are then closed and the pintle 37 replaced. The cylinder 34 with its associated cartridge is then slid into the shell, with the flange 39 resting on the seat 16 and the flange 31 resting on the collar 14. The closure 33 is removed and the pipe 19 is projected through the filling opening into the body of pulverulent material in the cartridge. If the closure is thin or readily fragile it may be easily punctured by the pipe 19 in inserting the latter. The shell 13 and the collar 22 are engaged and the collar is rotated to clamp the flange 31, between the top 20 and collar 14 so as to effect sealing relation therebetween. The top of the cartridge and the flange 31 are advantageously made thicker than the body of the cartridge so as to effectively serve as a gasket and to impart to it greater supporting strength.

The fluid to be filtered is delivered into the interior of the cartridge 30 through the perforated pipe 19 upon opening the valve 11 and flows through the contents of the cartridge, the cartridge wall and the cylinder 34 into the casing and thence out through the nozzle 18.

When it is desired to renew the cartridge the ring member 22 is turned thereby permitting the shell 13 with its supported cylinder 34 to drop out. The cylinder 34 is then removed and opened so that the soft, wet, pulpy mass may be dumped out. As the cartridge is exteriorly supported in use it retains its form and although of little or no structural strength it protects its contents and holds the wet mass of powder together sufficiently to prevent soiling the hands in the removal of the cartridge. When dumped out a new cartridge may be inserted and the parts reassembled. The removal and replacement is a quick, easy and clean operation.

While with some types of pulp a sufficient pressure can be exerted between the parts 14 and 21 to compress the flange 31 and form a water tight seal, I prefer to employ some form of supplementary seal. For instance, a rubber cap may cover the top of the cartridge and embrace the periphery, top and bottom of the flange 31. This may be a separately sold article or may be sold on and with each cartridge. Such a cap will prevent the dislocation of the closure during shipment. It may have a hole for the pipe 19 or be thin enough on the top to be punctured by the pipe 19 in inserting the cartridge in place in the apparatus.

Although it is not at all essential it is desirable to have the pipe 10 provided with a bracket having a collar 40 which loosely encircles the lower end of the casing. This serves to reinforce the shell against lateral strains or blows when in place and also guides the shell into proper alignment with the collar 22 in assembling the parts.

Having thus described my invention, what I claim as new and desire to secure by Letters Patent is:

1. A filter device including a cartridge constructed of filtering material and having a flange at one end extending outwardly from the main body of the cartridge, a filter media entirely enclosed within said cartridge, a rigid inner casing surrounding the main body of said cartridge and supporting the bottom and sides thereof, said casing being opened at one end and having said flange seated upon said end, said casing being constructed to permit the passage of fluid therethrough, an outer casing surrounding said inner casing and having an outlet opening, said flange serving as a gasket member between said outer and inner casings, and means for delivering the fluid to be filtered into the interior of said cartridge, whereby it may pass through the filter media and the walls of said cartridge into said outer casing.

2. A filter device including a cartridge having bottom and side walls constructed of porous fiber readily rupturable when wet and having a flange at one end thereof extending outwardly from the main body of the cartridge, a pulverulent filter media entirely enclosed within said cartridge, a foraminous inner casing opened at one end and surrounding the main body of said cartridge so as to support the bottom and sides thereof, an outer casing having a liquid inlet, and a liquid outlet, said flange serving as a gasket member between said housing and said casing, said inner casing being removable from said cartridge and from said outer casing, and said inner casing including relatively movable wall sections to permit removal of said cartridge without rupturing the wall of the latter.

3. A cartridge adapted for sale, shipment, and storage, and for use in a filtering apparatus, and including a peripheral wall, top and bottom walls integral therewith, said walls being constructed of porous pulp, a compressible portion at one end of said peripheral wall and integral therewith, said flange being adapted for use as a gasket, and a loose mass of pulverulent filtering material in said cartridge, one wall of said cartridge having an opening therein, and a closure therefor adapted to be removed to permit the insertion of a liquid supply pipe into the interior of said mass, upon insertion of said cartridge into a filtering apparatus.

4. A filter device including a preformed cartridge constructed of molded fiber, and having bottom and side walls which are comparatively stiff when dry and readily rupturable when wet, a pulverulent filtering media enclosed within said cartridge, a rigid casing formed of relatively movable sections and adapted to open to permit said cartridge to be inserted therein to support the bottom and sides thereof, and to prevent rupture thereof when said cartridge is wet, and to permit removal of the wet cartridge after use and without rupture, and constructed to permit the passage of fluid therethrough, and means for introducing the fluid to be filtered into the interior of said cartridge whereby said fluid may pass outwardly through the walls thereof.

5. A filter device including a preformed cartridge constructed of fiber molded in one continuous piece, and having bottom and side walls which are comparatively stiff when dry and readily rupturable when wet, a filling of filter media enclosed within said cartridge, a rigid casing formed of relatively movable sections and adapted to open to permit said cartridge to be inserted therein to support the bottom and sides thereof, and to prevent rupture thereof when said cartridge is wet, and to permit removal of the wet cartridge after use and without rupture and constructed to permit the passage of fluid therethrough, a fluid supply pipe projecting through one end of the cartridge into the interior of said media, whereby the fluid to be filtered is introduced into the interior of said filling and passed outwardly through the latter and the walls of said cartridge.

6. A new article of manufacture adapted to be used in a filtering device, and including a hollow shell of molded porous pulp, which is comparatively stiff when dry and readily rupturable when wet, said shell being provided with an integral outwardly extending annular compressible flange at one end thereof adapted for use as a gasket, and an annular inwardly extending flange at the same end, and defining an opening through which a liquid supply pipe may be projected.

7. A filtering device including an outer casing having a stationary top portion, and removable peripheral and bottom walls having a liquid outlet, a liquid supply pipe depending from said stationary top portion, a foraminous casing having peripheral and bottom walls, the top of said foraminous casing being opened, and having a peripheral flange extending outwardly from the opened end, and resting on the top of the peripheral wall of the outer casing, and a cartridge of filtering material within said foraminous casing and having peripheral and bottom walls, and a peripheral flange resting on said first mentioned flange, the peripheral and bottom walls of said cartridge being in close proximity to the peripheral and bottom walls of said foraminous casing, said flanges being clamped between said stationary top portion and the peripheral wall of said outer casing.

8. A filter apparatus including a preformed hollow shell of molded porous pulp having a continuous cylindrical wall and a bottom wall integral therewith, said walls being comparatively stiff when dry and having little if any structural strength when wet, and a supporting and reinforcing casing snugly fitting the exterior of said cylindrical and bottom walls and having apertures therethrough to permit the flow of filtered liquid, but of such size as to prevent rupturing the shell by the flow of liquid through said shell and through said apertures, said casing being formed of sections readily separable to permit removal of said shell without rupturing when wet.

9. A filtering device including a cartridge constructed of molded fibre material comparatively stiff when dry and readily rupturable when wet and having a filling of pulverulent filter material, a foraminous comparatively rigid casing having a bottom wall and a cylindrical wall, the cylindrical wall being constructed of two halves hinged together and each half including a portion of said bottom wall, whereby said casing may be opened upon said hinge to permit insertion and removal of said cartridge and when closed to support the bottom and cylindrical walls of the cartridge and prevent rupture of said cartridge when the latter is in use and subjected to internal liquid pressure, and a perforated pointed liquid supply pipe adapted to be projected into said cartridge and into the pulverulent material, whereby said liquid will flow outwardly through said cartridge and said foraminous casing.

10. A cartridge adapted for sale, shipment, and storage, and for use in a filtering apparatus, and including a peripheral wall, top and bottom walls integral therewith, said walls being constructed of porous pulp, a compressible portion at one end of said peripheral wall and integral therewith, said portion being adapted for use as a gasket, one wall of said cartridge having an opening therein, and a closure therefor adapted to be removed to permit the insertion of a liquid supply pipe into the interior of said mass, upon insertion of said cartridge into a filtering apparatus.

LOUIS M. GILL.